United States Patent Office
3,649,558
Patented Mar. 14, 1972

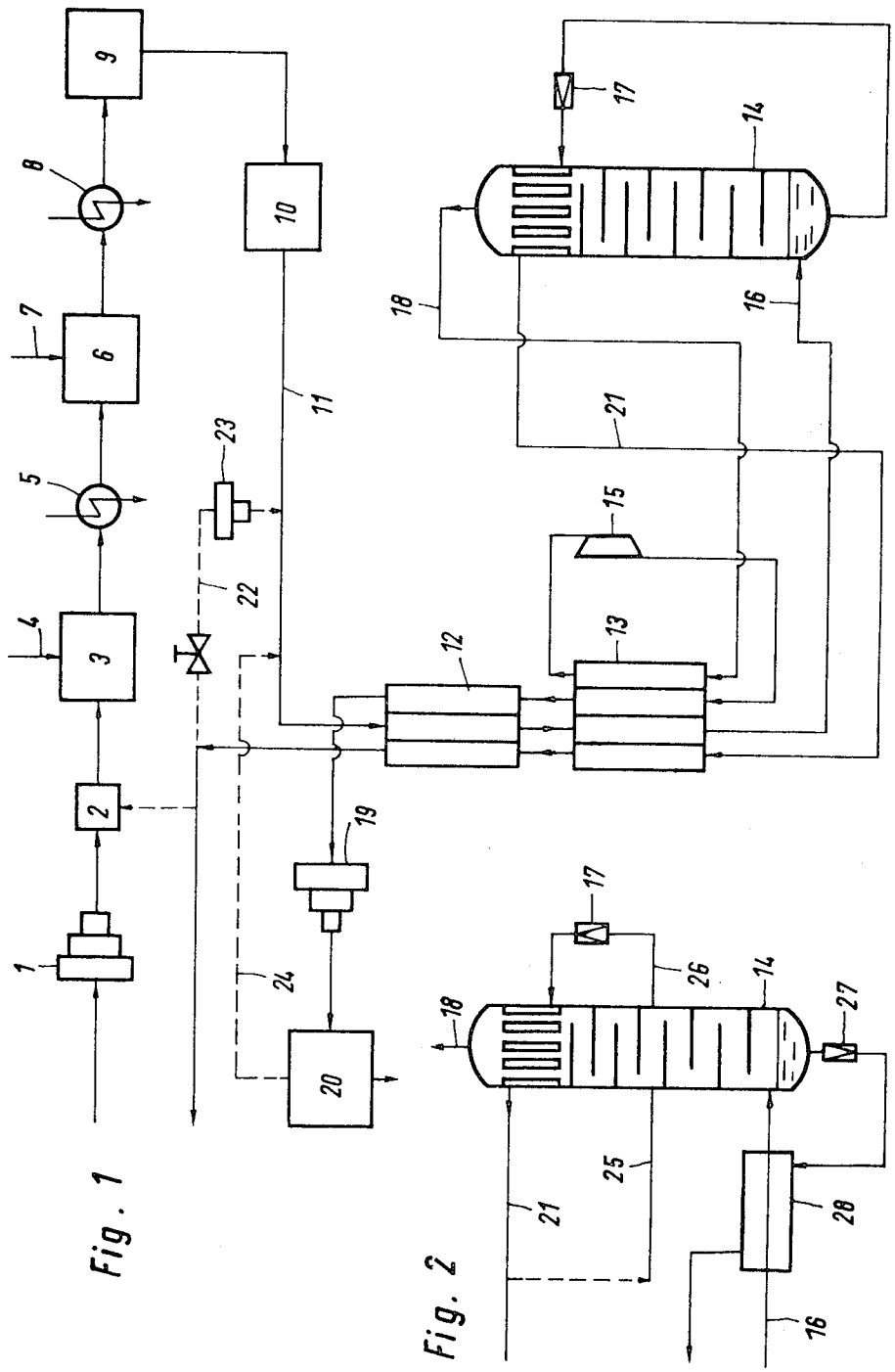

1

3,649,558
PROCESS AND APPARATUS FOR THE PRODUCTION OF AMMONIA SYNTHESIS GAS
Gerhard Linde, Munich, Walter Scholz, Wolfratshausen, and Rudolf Becker, Munich, Germany, assignors to Linde Aktiengesellschaft, Wiesbaden, Germany
Filed Aug. 22, 1968, Ser. No. 754,652
Claims priority, application Germany, Aug. 29, 1967, L 57,318
Int. Cl. C01b 2/30; F25j 3/02; C01c 1/04
U.S. Cl. 252—376
15 Claims

ABSTRACT OF THE DISCLOSURE

Ammonia synthesis gas is produced from gases containing hydrogen and hydrocarbons by subjecting the hydrocarbons to partial oxidation with air, removing the main quantity of the higher boiling components, cooling the remaining gaseous mixture to liquefy a portion of the nitrogen therein and scrubbing the remaining impurities from the nitrogen-hydrogen mixture in a rectification column. Additional reflux liquid is obtained by one or more of the following techniques:
(a) withdrawing a portion of the liquid nitrogen after scrubbing from a mid-portion in the rectification column several plates below said head condenser, evaporating said withdrawn portion and partly recycling said evaporated portion to the rectification column at approximately the mid-portion thereof;
(d) admixing re-evaporated scrubbing agent to the crude gas before partial oxidation thereof;
(c) admixing part of the re-evaporated scrubbing agent to the gas to be separated; and recycling a portion of waste gas from an ammonia synthesis cycle to the gas to be separated. There is also provided apparatus for the above processes.

BACKGROUND OF THE INVENTION

The invention relates broadly to a process and apparatus for obtaining ammonia synthesis gas, and more particularly to such a process for producing ammonia synthesis gas from gases containing hydrogen and hydrocarbons, such, for example, as coke oven gas.

Conventionally, in the separation of hydrogen-containing gases, such, for example, as coke oven gas, for the purpose of obtaining hydrogen for ammonia synthesis, the hydrogen is freed from all higher-boiling impurities by cooling the gaseous mixture in regenerators or reversible tubular heat exchangers. The hydrogen is then washed with liquid, extremely pure nitrogen to remove even the last traces of impurities, particularly of carbon monoxide. Methane contained in the coke oven gas is, in this connection, either separated together with water and carbon dioxide in the main heat exchangers, or, at a lower temperature, in countercurrent heat exchangers connected thereafter, to form, together with the re-evaporated sump of the nitrogen scrubbing column, a so-called residual gas.

In order to improve the economy of the above process, it has been suggested (see "Linde-Beriche aus Technik und Wissenschaft" [Linde Reports on Science and Technology], No. 17, pp. 66 et seq.) that the hydrocarbons contained in gases such as coke oven gas, be subjected before separation from the hydrogen, to partial oxidation in order to supply the hydrogen contained in the hydrocarbons to the ammonia synthesis process. This conventional method requires a source of oxygen for the partial oxidation of the hydrocarbons and it has been heretofore customary to employ the oxygen produced during the production of pure nitrogen for the nitrogen scrubbing step in an air separation plant for this purpose. The conventional process, therefore, requires a separate air separation plant.

SUMMARY OF THE INVENTION

The present invention provides a process for the separation of gases containing hydrogen and hydrocarbons, which utilizes for the ammonia synthesis the hydrogen contained in the hydrocarbons without requiring a special air separation plant.

This objective is attained, in a preferred embodiment of the invention, by partially oxidizing the hydrocarbons with air; removing a main portion of the higher-boiling components from the gaseous mixture; and cooling the remain gaseous mixture to a point that a portion of nitrogen contained therein, derived from the air, is liquefied and is utilized to scrub the remaining impurities from the resultant nitrogen-hydrogen mixture.

These and other objects of the invention will become more apparent to those skilled in the art by reference to the following detailed description when viewed in light of the accompanying drawings wherein like components throughout the figures thereof are indicated by like numerals and wherein:

BRIEF DESCRIPTION OF THE DRAWINGS

FIG. 1 is a schematic view of an apparatus for conducting a process in accordance with the invention; and
FIG. 2 is a view of a portion of the apparatus of FIG. 1 showing a variation therein.

DESCRIPTION OF THE PREFERRED EMBODIMENTS

This invention is preferably practiced in connection with coke gas, refinery gases, or other gases containing by volume about 50–70% hydrogen and about 20–30% hydrocarbons.

The gas is first compressed to as high a pressure as possible, and the hydrocarbons contained therein are then subjected to oxidation. In this connection, the oxidation can take place in an uncatalyzed partial combustion process with the addition of steam or can be conducted with the concomitant use of catalysts in the manner of conventional steam reformation. In the last-mentioned type of oxidation, however, only the secondary stage of the steam reformer need be employed, since the above-mentioned gaseous mixtures contain only lower hydrocarbons and the primary reformer of the steam reformer thereby becomes superfluous. The process of steam reformation exhibits an advantage, over the uncatalyzed combustion, in that the reaction temperatures can be lower. On the other hand, steam reformation requires a preceding purification of the gas employed, since the catalysts utilized in such oxidation are sensitive to the sulfur compounds contained in most cases in the gases in question.

Both of the above oxidation processes, in the final analysis, yield a mixture of $H_2$, $CO$, $CO_2$ $H_2O$ and $CH_4$ which, when the oxidation is conducted in accordance with the process of this invention with air, also contains a suitable amount of nitrogen to not only completely satisfy the stoichiometric requirements for the ammonia synthesis gas, but sufficient nitrogen such that a portion thereof can be utilized, in a further development of the idea of this invention, for scrubbing out the remaining impurities.

After oxidation, a large portion of the impurities and reaction products accompanying the hydrogen is removed. In this connection, the CO formed during the oxidation reaction is converted to $CO_2$ by means of steam. The use of steam for this purpose also generates additional hydrogen for the ammonia synthesis. The $CO_2$ present in the gas can then be either frozen out together with any sulfur compounds present, by cooling in reversible regenerators or countercurrent heat exchangers, or scrubbed out with the aid of a potash or methanol washing step as is known in the art.

The regenerator process for $CO_2$ removal has the advantage of economy, but the high final purity of the gas of the above-mentioned scrubbing process is not insured. The regenerator process, however, will be particularly applicable where the oxidation of the hydrocarbons contained in the starting gas is conducted with the aid of a catalyst, since desulfurization of the gas was required before oxidation, and the resultant gas, therefore, will not contain sulfur compounds in the $CO_2$ removal stage. If, on the other hand, the oxidation of the hydrocarbons is carried out without a catalyst, then the gas can, in certain cases, still be very rich in sulfur. In this instance, the scrubbing process is preferred for $CO_2$ removal to thereby assure that entrainment of sulfur compounds in the ammonia synthesis stage is avoided. It is preferred that traces of CO remaining in the gas even after the conversion step be removed quantitatively before the gas enters the nitrogen scrubbing step to in this manner unburden the nitrogen washing step. To this end, methanation is most suitable, since it is merely necessary to conduct the gas, at a somewhat elevated temperature over a suitable catalyst. The minor losses of hydrogen which may occur in this step can be tolerated without difficulty.

After the methanation, a gaseous mixture consisting of hydrogen, nitrogen and residues of argon and methane results. The mixture generally contains about 10–30% more nitrogen than required to satisfy the stoichiometric quantitative proportion of $3H_2+N_2$. In the novel process, this excess nitrogen is separated at low temperatures by partial condensation and rectification of the gas. The residual methane is almost completely separated, and the residual argon is also separated to the larger part thereof by this process. In this manner, a nitrogen-hydrogen mixture having a very low content of inert gases is obtained.

The above partial condensation is conducted in a rectification column provided with a head condenser, to the lower part of which the $H_2$—$N_2$—Ar—$CH_4$ mixture to be separated is fed in the gaseous phase. Part of the nitrogen from the gaseous mixture rising in the column is liquefied at the head condenser, which liquefied nitrogen then dissolves argon and methane from the gaseous mixture while running down over the plates. In this connection, the head condenser can be cooled by expanded sump product of the column.

As set forth above, the gas still contains certain residues of argon and methane after leaving the column. The residual argon, in particular, is very much dependent on the reflux relationships in the column. The methane, due to its greater solubility in nitrogen, enters the synthesis gas to only a minor extent. Although neither of these gases interferes with the subsequent ammonia synthesis process, since they are inert, an unnecessary increase in the volume of the gas being synthesized results. Reduction of the volume of these two gases is of considerable importance to the economy of the process because of the great amount of compression work which must be expended prior to the synthesis proper. However, in reducing this unnecessary volume, difficulties are encountered, particularly when the gaseous mixture introduced into the rectification column only contains small excesses of nitrogen beyond that required for the correct stoichiometric relationship for the synthesis, thereby rendering it impossible to produce sufficient reflux liquid from the gas by means of simple partial condensation.

A typical composition of a gas entering the rectification column and having a nitrogen content insufficient to remove all the argon contained therein is as follows:

| | Percent |
|---|---|
| $H_2$ | 64.75 |
| $N_2$ | 33.2 |
| Ar | 0.35 |
| $CH_4$ | 1.7 |

With this amount of nitrogen present in the gas it is possible to remove only about 50–60% of argon contained therein.

To overcome the above deficiency, the reflux in the rectification column can be, in accordance with various embodiments of the invention, increased by branching off a portion of the residual gas at a suitable point and admixed with the gaseous mixture to be rectified before it enters the rectification column.

In the above illustrative example, about up to 50% of the residual gas is used for increasing the reflux. For the same purposes, it is also possible to employ, instead of a portion of the residual gas, up to 10% of the waste gas of the ammonia synthesis process, which, due to its nitrogen content, likewise represents a gas suitable for increasing the reflux in the rectification column. Reflux can also be increased by recycling a portion of the residual gas through the column, and evaporating the sump product of the rectification column in the head condenser or in countercurrent heat exchangers connected in front thereof. It is furthermore possible also to return the residual gas to the crude gas before the partial oxidation step.

In FIG. 1, about 65,000 Nm.³/h. of coke oven gas having approximately the following composition:

| | Percent |
|---|---|
| $H_2$ | 58 |
| $N_2$ | 6 |
| CO | 6 |
| $CH_4$ | 24 |
| $C_nH_m$ | 3 |
| $CO_2$ | 3 | is fed to a compressor 1 and is compressed therein to a pressure of about 30 atmospheres absolute. The gas is next preheated to a temperature of between 300–400° C. in a preheater 2 and then introduced into a partial oxidation furnace 3, where the hydrocarbons present in the gas are partially oxidized by the addition of about 50,000 Nm.³/h. of air through a conduit 4. In the illustrated embodiment, the partial oxidation furnace 3 is equivalent to the secondary reformer of a steam reformation, and thus operates with a catalyst such, for example as nickel. For this reason, the gas entering the compressor 1 is previously freed of sulfur in some conventional manner, to avoid poisoning of the catalyst. The hydrocarbons contained in the gas are substantially oxidized to CO and $CO_2$, respectively, in the partial oxidation furnace 3, the gas then exhibiting, after reaction, a volume of about 139,000 Nm.³/h. and a temperature of about 700–800° C. A portion of the heat present in the oxidized gas is then released in a waste heat recovery device 5, whereupon the gas enters a conversion plant 6 in which, by means of 16 tons/h. of steam introduced through a conduit 7, the CO contained in the gas is converted into $CO_2$ with a residue of around 0.7% CO. About 158,000 Nm.³/h. of gas exits from the conversion plant 6, from which gas heat is removed in a waste heat recovery device 8.

The converted gas is next fed to a $CO_2$-removal plant 9 where it is freed of about 24,000 Nm.³/h. of $CO_2$. The plant 9 can consist either of regenerators or tubular countercurrent heat exchangers in which the $CO_2$ is frozen out, or it can consist of a methanol or potash washing stage wherein the $CO_2$ is removed by solution or chemical reaction. Neither of these modes of operation need be discussed in more detail, since both are sufficiently known in the art.

The gas, freed of $CO_2$, then enters a methanation plant 10 in which the residual CO present in the gas is reduced to $CH_4$ by contact with a suitable catalyst, as is well understood by those skilled in the art. 132,000 Nm.³/h. of gas having a CH₄-content of 1.7% exits the plant 10.

The gas is next conducted, through conduit 11, into the low-temperature section of the apparatus, which consists essentially of heat exchangers 12 and 13, a rectification column 14, and an expansion turbine 15. In the heat exchangers 12 and 13, the gas is cooled to a temperature somewhat above the liquefaction temperature of the nitrogen present in the gas at the process pressure of 30 atmospheres absolute. In the illustrated process, this temperature is about 100° K. At this temperature, the gas is introduced through conduit 16 into the rectification column 14. The liquid sump product collecting on the bottom of the column, consisting essentially of nitrogen, argon and methane, is expanded to approximately atmospheric pressure in a throttle valve 17 and evaporated in the head condenser of column 14 at a temperature of about 94° K. This temperature is sufficient to condense a portion of the nitrogen contained in the vapors rising in the column, so that the nitrogen can function as a reflux liquid to extensively scrub methane and argon from the rising gas.

About 112,000 Nm.³/h. of nitrogen-hydrogen mixture ready for synthesis is withdrawn from the head of the rectification column 14 through a conduit 18. The mixture is heated to a temperature of about 105° K. in the heat exchanger 13 engine expanded [expansion with the production of outside work] in the turbine 15 to a pressure of about 22–23 atmospheres absolute, and then redirected through the heat exchangers 13 and 12 for release of refrigeration. After compression to the process pressure of the ammonia synthesis, in a compressor 19, for example, 200 atmospheres absolute, the gas is fed to an ammonia synthesis stage 20 where 1,000 tons/day of ammonia is obtained from the gas.

Residual gas constituting 20,000 Nm.³/h. of the sump product evaporated in the head condenser of the column 14 is withdrawn via a conduit 21 and transmits refrigeration to the gas from the methanation counterflowing in heat exchangers 13 and 12. The residual gas can then be utilized as a fuel in the preheater 2 for heating the incoming compressed gas if so desired.

In order to attain an even more satisfactory separation of argon from the synthesis gas, a portion of this gas can be branched off via a conduit 22, compressed in a compressor 23 to a pressure of about 30 atmospheres absolute, and admixed to the CO-free gas in conduit 11. By this admixture of nitrogen-enriched residual gas, it is possible to significantly enlarge the reflux in the rectification column 14 and thus considerably increase the purity of the head product, since the admixed gas is extensively condensed at the head condenser of the rectification column 14.

As an alternative to recycling residual gas through the conduit 22 and compressor 23 as described above, it is possible to introduce a portion of the waste gas from the ammonia synthesis through a conduit 24 to thereby employ this portion for enlarging the reflux in column 14.

In accordance with a special modification of the invention, the residual gas, or a portion thereof, is not admixed to the gas to be rectified before entering the rectification column, but is introduced into the rectification column by way of a special conduit at approximately the middle thereof. Simultaneously with this lateral feeding of residual gas, an additional, special process step is provided which leads to an extraordinary enlargement of the reflux, especially in the upper portion of the column. For this purpose, a liquid fraction, other than a sump product, is employed for cooling the head condenser of the column. This liquid fraction is withdrawn from the column at approximately the point where the gaseous residual gas is introduced. The entire amount of gas or liquid conducted in the cycle is thereby substantially restricted to the upper portion of the column, affording the advantage that the pure gas exiting the head of the column exhibits a substantially lower content or argon than occurs if the residual cycle gas is added to the gas to be rectified upstream of the column.

The withdrawal and recycling of reflux and residual gas, respectively, at the middle furthermore has the consequence that comparatively little liquid flows off in the lower portion of the column. With this arrangement, it is surprisingly found that a relatively small amount of scrubbing agent in the lower portion of the column is sufficient to dissolve the methane present in the gas. In exchange, however, a purer scrubbing agent or, in other words, an agent having higher percentage of nitrogen, is provided in the upper portion of the column, thereby furnishing a head product of greater purity.

In FIG. 2, the modified rectification column 14 is illustrated.

Components in this figure corresponding to those of FIG. 1 are provided with the same reference numerals. After a portion of the refrigeration of the residual gas has been withdrawn in the heat exchangers (FIG. 1), between 60 and 80%, and preferably about 70% of the gas is withdrawn from the conduit 21, recompressed to column pressure in a compressor (not shown) and directly recycled through a conduit 25 to a point approximately in the middle of the rectification column 14, several plates below the head condenser and several plates above the sump. In a similar manner, the liquid reflux from the head condenser is withdrawn from approximately the middle of the column 14 through a conduit 26 rather than from the foot thereof, and throttle expanded in 17, as in FIG. 1.

After throttle expansion in a valve 27, the refrigeration contained in the sump liquid is transmitted to the gas to be fractionated in a heat exchanger 28.

As an example, about 84,000 Nm.³/h. of $H_2$, 32,000 Nm.³/h. of $N_2$ and 1,000 Nm.³/h. of $CH_4+Ar$ are introduced through the conduit 16 into the column 14. Where about 112,000 Nm.³/h. of synthesis-ready mixture $3H_2+1N_2$ is withdrawn through conduit 18 from a space above the head condenser, the following values are obtained for lateral withdrawal and residual gas recycling: About 14,000 Nm.³/h. of liquid is withdrawn through the conduit 26, expanded in the throttle valve 17, and evaporated in the head condenser. Of this quantity, about 10,000 Nm.³/h. is branched from the conduit 21 and recycled through the conduit 25, whereas about 4,000 Nm.³/h. with a content of about 10% Ar, exits as residual gas. The total amount of reflux between the head condenser and the conduit 26 is about 15,000 Nm.³/h., so that, after 14,000 Nm.³/h. is withdrawn through the conduit 26, about 1,000 Nm.³/h. remains to flow to the lower portion of the column to exit from the sump with a content of 30–40% of $CH_4$.

The above-described process of withdrawing and recycling backflow gas at a mid-point of the column is completely independent of the pretreatment of the gas to be rectified. The process can be applied quite generally to nitrogen-hydrogen mixtures having the above-mentioned impurities, or similar impurities.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be within the full range of equivalence of the following claims.

What is claimed is:

1. In a process for the production of ammonia synthesis gas from gas containing hydrogen and hydrocarbons, wherein the hydrocarbons contained in the gas are subjected to partial oxidation with air to produce higher boiling constitutents, and the major portion of the higher-boiling constituents are separated from the hydrogen, and wherein the hydrogen and nitrogen serve as the nitrogen-hydrogen mixture proper for synthesis, the improvement comprising the steps of cooling the remaining gaseous mixture to liquefy nitrogen contained therein derived from the air to form liquid nitrogen; scrubbing the residual impurities from the nitrogen-hydrogen mixture with said liquid nitrogen in a rectification column having a sump and a head condenser; withdrawing a portion of the liquid nitrogen after scrubbing from a mid-portion in the rectification column several plates below said head condenser and several plates above the sump, evaporating said withdrawn portion and partly recycling said evaporated portion to the rectification column at approximately the mid-portion thereof.

2. Process according to claim 1, wherein a major portion of carbon monoxide produced during the partial oxidation of the hydrocarbons is converted to carbon dioxide.

3. Process according to claim 2, wherein carbon dioxide is scrubbed from the remaining gaseous mixture by means of a scrubbing agent.

4. Process according to claim 2, wherein carbon dioxide is separated from the remaining gaseous mixture by cooling in a regenerator.

5. Process according to claim 2, wherein carbon monoxide remaining after conversion is methanated to produce methane.

6. Process according to claim 5, wherein the thus-formed methane is scrubbed out of the remaining gaseous mixture by liquid nitrogen in said rectification column.

7. Process according to claim 6, wherein the evaporated nitrogen is partly admixed with gaseous mixture to be separated in the rectification column.

8. Process according to claim 7, wherein the evaporated nitrogen is, at least in part, admixed to said gas containing hydrogen and hydrocarbons before partial oxidation thereof.

9. Process according to claim 1 wherein a portion of waste gas from an ammonia synthesis process is recycled to the gaseous mixture to be separated.

10. Process according to claim 1, wherein the said liquid nitrogen is throttle expanded and evaporated in a head condenser of said rectification column.

11. Process for removing impurities from nitrogen-hydrogen gaseous mixtures, comprising the steps of scrubbing impurities from the nitrogen-hydrogen gaseous mixture with liquid nitrogen in a rectification column having a head condenser and a sump, withdrawing a portion of the liquid nitrogen after scrubbing from a mid-portion in the rectification column several plates below said head condenser and several plates above the sump, evaporating said withdrawn portion and partly recycling said evaporated portion to the rectification column at approximately the mid-portion thereof.

12. Process in accordance with claim 11, wherein said liquid nitrogen is throttle expanded and evaporated in a head-condenser of said rectification column.

13. An apparatus for purifying nitrogen-hydrogen mixtures comprising a rectification column having a head condenser and a sump, gas feeding means communicative between said head condenser and a mid-portion of said column, said mid-portion being several plates below said head condenser and several plates above said sump, liquid withdrawing means communicative between said mid-portion of said column and said head condenser, gas outlet means in communication with a space above said head condenser, and liquid discharge means at the bottom of said rectification column.

14. A process as defined by claim 1, wherein 60–80% of said evaporated portion is recycled to the rectification column at approximately the mid-portion thereof.

15. A process as defined by claim 11, wherein 60–80% of said evaporated portion is recycled to the rectification column at approximately the mid-portion thereof.

References Cited

UNITED STATES PATENTS

| | | | |
|---|---|---|---|
| 1,889,934 | 12/1932 | Richardson | 23—198 |
| 2,610,106 | 9/1952 | Gray | 23—199 |
| 3,407,146 | 10/1968 | Becker et al. | 23—199 |

OSCAR R. VERTIZ, Primary Examiner

H. S. MILLER, Assistant Examiner

U.S. Cl. X.R.

62—28; 23—193; 252—377; 55—89